United States Patent
Hassani et al.

(10) Patent No.: US 9,489,966 B1
(45) Date of Patent: Nov. 8, 2016

(54) DISCREET EMERGENCY RESPONSE

(71) Applicant: Ford Global Technologies, LLC, Dearborn, MI (US)

(72) Inventors: Ali Hassani, Ann Arbor, MI (US); Arun Dutta, Ann Arbor, MI (US); Adil Nizam Siddiqui, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 14/724,900

(22) Filed: May 29, 2015

(51) Int. Cl.
*B60Q 1/00* (2006.01)
*G10L 25/63* (2013.01)
*B60Q 9/00* (2006.01)
*G10L 15/22* (2006.01)

(52) U.S. Cl.
CPC ............. *G10L 25/63* (2013.01); *B60Q 9/00* (2013.01); *G10L 15/22* (2013.01)

(58) Field of Classification Search
None
See application file for complete search history.

(56) References Cited

U.S. PATENT DOCUMENTS

| | | | | |
|---|---|---|---|---|
| 6,073,004 A * | 6/2000 | Balachandran | ...... | G08B 25/001 379/39 |
| 6,642,844 B2 | 11/2003 | Montague | | |
| 8,630,820 B2 | 1/2014 | Amis | | |
| 2006/0132294 A1 | 6/2006 | Spark | | |
| 2009/0161787 A1 * | 6/2009 | Singh | ...... | H04M 3/53 375/295 |
| 2010/0045460 A1 * | 2/2010 | Caler | ...... | G08B 25/012 340/541 |
| 2012/0087482 A1 | 4/2012 | Alexander, Sr. | | |
| 2012/0256769 A1 * | 10/2012 | Satpathy | ...... | G08B 13/19647 340/989 |
| 2013/0070043 A1 | 3/2013 | Geva | | |
| 2013/0339019 A1 * | 12/2013 | Giancarlo | ...... | G10L 15/04 704/251 |
| 2015/0269835 A1 * | 9/2015 | Benoit | ...... | G08B 25/10 340/539.13 |
| 2015/0295575 A1 * | 10/2015 | Lee | ...... | H03K 17/693 327/416 |
| 2015/0364139 A1 * | 12/2015 | Dimitriadis | ...... | G06K 9/00335 704/231 |
| 2016/0035346 A1 * | 2/2016 | Chengalvarayan | ...... | G10L 15/07 704/246 |
| 2016/0221583 A1 * | 8/2016 | Valeri | ...... | B60W 50/0098 |

* cited by examiner

*Primary Examiner* — Ojiako Nwugo
(74) *Attorney, Agent, or Firm* — Frank MacKenzie; Bejin Bieneman PLC

(57) ABSTRACT

A vehicle system includes a microphone programmed to capture sounds in a passenger compartment of a vehicle and output a sound signal. A speech analyzer analyzes the sound signal for distressed speech and for action words. The speech analyzer outputs an alert signal if distressed speech and action words are detected. A processing device receives the alert signal and initiates contact with an emergency service provider in response to the alert signal.

19 Claims, 2 Drawing Sheets

DISCREET EMERGENCY RESPONSE

BACKGROUND

Some vehicle infotainments systems permit vehicle occupants to make hands-free telephone calls. For example, the infotainment system will pair with an occupant's cell phone. The infotainment system will enable the in-vehicle microphone and route the audio through the vehicle's speakers. In vehicles with a touch-screen display, a contextual menu may allow the occupant to enter a phone number, dial a phone number, select a phone number from an address book, and end the call. The infotainment system may further automatically call for emergency services following a collision.

DETAILED DESCRIPTION

Infotainment systems that automatically call an emergency service provider after a collision assume that the driver is unable to call following the collision. The driver may be unconscious, disoriented, or otherwise unable to reach or use his or her cell phone. There are instances, however, where the occupant needs emergency assistance but is unable to call for other reasons such as if calling for emergency assistance would put one or more occupants at risk. Such instances may include abductions, domestic violence, carjacking, etc., where a perpetrator may be in the vehicle with the person in distress.

A vehicle system that discreetly contacts an emergency service provider includes a microphone programmed to capture sounds in a passenger compartment of a vehicle and output a sound signal. A speech analyzer analyzes the sound signal for distressed speech and for action words. The speech analyzer outputs an alert signal if distressed speech and action words are detected. A processing device receives the alert signal and initiates contact with an emergency service provider in response to the alert signal. The vehicle system will discreetly contact the emergency service provider to offer assistance to the vehicle occupant.

The elements shown may take many different forms and include multiple and/or alternate components and facilities. The example components illustrated are not intended to be limiting. Indeed, additional or alternative components and/or implementations may be used.

Figure 1:
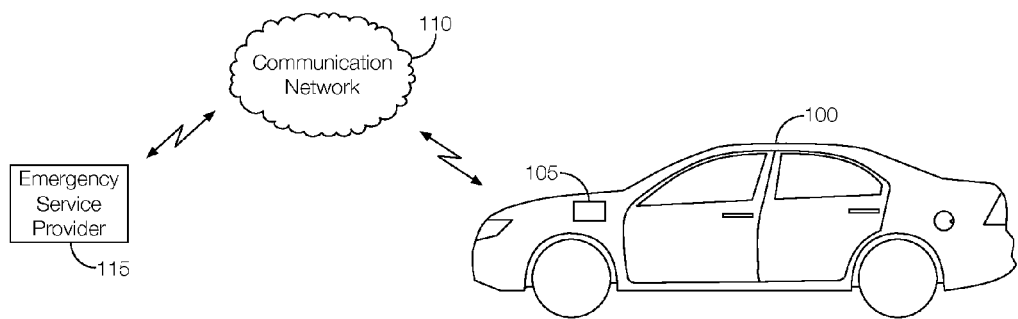
FIG. 1 illustrates an example vehicle with an emergency calling system.

As illustrated in FIG. 1, the host vehicle 100 includes an emergency calling system 105. The emergency calling system 105 may communicate over a communication network 110 to initiate a call to an emergency service provider 115 such as a police department, fire department, hospital or ambulance service, etc. Although illustrated as a sedan, the host vehicle 100 may include any passenger or commercial automobile such as a car, a truck, a sport utility vehicle, a crossover vehicle, a van, a minivan, a taxi, a bus, etc. In some possible approaches, the host vehicle 100 is an autonomous vehicle configured to operate in an autonomous (e.g., driverless) mode, a partially autonomous mode, and/or a non-autonomous mode.

Figure 2:
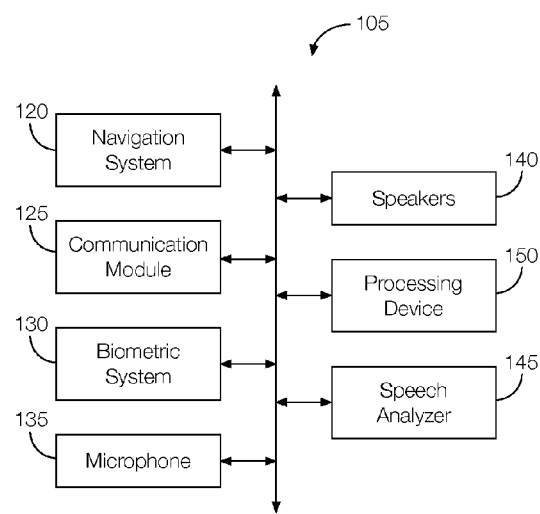
FIG. 2 illustrates example components of the emergency calling system.

Referring now to FIG. 2, the emergency calling system 105 may include a navigation system 120, a communication module 125, a biometric system 130, a microphone 135, speakers 140, a speech analyzer 145, and a processing device 150. In some instances, certain components such as the navigation system 120, communication module 125, biometric system 130, microphone 135, and speakers 140 may have other purposes in the host vehicle 100 but may nevertheless be used by the emergency calling system 105.

The navigation system 120 may be programmed to determine a location of the host vehicle 100. The navigation system 120 may include a Global Positioning System (GPS) receiver programmed to triangulate the position of the host vehicle 100 relative to satellites or terrestrial based transmitter towers.

The communication module 125 may be programmed to facilitate wired or wireless communication between the components of the host vehicle 100 and, e.g., the emergency service provider 115 over the communication network 110. The communication module 125 may be programmed to receive and transmit messages according to cellular or satellite-based communication protocols. The communication module 125 may also be programmed to facilitate wireless communication with an occupant's remote device, such as a mobile phone, using any number of communication protocols such as Bluetooth®, Bluetooth® Low Energy, or WiFi.

The biometric system 130 may include any electronic device programmed to detect certain biometrics associated with an occupant of the host vehicle 100. The biometric system 130 may be programmed to detect, e.g., heart rate, pupil dilation, etc., to determine whether one or more occupants is distressed. The biometric system 130 may be incorporated into another vehicle component, such as a seat or steering wheel. Alternatively, the biometric system 130 may be incorporated into a wearable device such as a smart watch or fitness tracker. The biometric system 130 may be programmed to output signals representing the detected biometrics to, e.g., the processing device 150.

The microphone 135 may include any electronic or electromechanical device that includes a transducer or other type of sensor that converts sound to an electric signal. The microphone 135 may be located in the passenger compartment of the host vehicle 100 so that it may capture sounds made by occupants in the passenger compartment. The microphone 135 may be further configured or programmed to output a sound signal representing the captured sounds. The microphone 135 may be programmed to output the sound signal to the speech analyzer 145.

The speakers 140 may include any electronic or electromechanical devices that are able to convert digital or analog electronic signals into audible sound waves. The speaker may receive electronic signals from, e.g., the user's mobile phone so that the sound may be played within the passenger compartment of the host vehicle 100. The speakers 140 may be controlled to provide different volumes. In some instances, the speakers 140 may be muted, meaning that no sound will be projected from the speakers 140.

The speech analyzer 145 may include any electronic device programmed to analyze the sound signal output by the microphone 135. The speech analyzer 145 may analyze the sound signal for distressed speech, for action words, or both. To detect distressed speech, the speech analyzer 145 may analyze the sound signal for changes in a speaker's spectral density. For instance, the speech analyzer 145 may determine that an occupant is in distress when the occupant's spectral density shifts to higher frequencies and utterances are made with shorter durations. Alternatively or in addition, the speech analyzer 145 may determine that the occupant is distressed based on the signals output by the biometric system 130.

After detecting distressed speech or otherwise determining that the occupant is in distress, the speech analyzer 145 may be further programmed to listen for action words. The action words may include any predetermined words or phrases that an occupant has identified, during a training process, for purposes of having the emergency calling system 105 discreetly contact an emergency service provider 115. Other types of action words may include, e.g., threatening words that may be spoken by a perpetrator located in the passenger compartment with the occupant.

To reduce the likelihood of false positives, the action words may include less common words or words that the occupant would not normally say during normal conversation. Another way to reduce false positives may include the speech analyzer 145 being programmed to listen for disable words, which may include words indicating that the discreet call should not be made.

To reduce processing requirements, as well as to reduce the likelihood that the system 105 will be accidentally triggered, the speech analyzer 145 may be programmed to only listen for action words after detecting that the occupant's distressed speech. If the speech analyzer 145 determines that the occupant is in distress based on the detected distressed speech and the identification of action words, which may be spoken by the occupant or the perpetrator, the speech analyzer 145 may output an alert signal to, e.g., the processing device 150.

The speech analyzer 145 may be programmed to analyze the speech signal according to a user profile. The user profile may be associated with an occupant, such as the driver, of the host vehicle 100. For vehicles with multiple drivers, the speech analyzer 145 may be programmed to select among multiple user profiles, each associated with a different driver. The speech analyzer 145, for example, may be programmed to select the user profile based on an owner of a paired mobile device, an identification of the occupant sitting in the driver seat, or the like. The user profile may be established and associated with a particular driver during a training process. The training process may allow the speech analyzer 145 to associate a particular occupant's voice to a particular user profile, which may increase the accuracy of the speech analyzer 145 in analyzing the sound signal. Moreover, the training process may allow the occupant to identify action words, disable words, or both. The speech analyzer 145 may continually update the user profile as more and more speech from a particular occupant is recorded and analyzed.

The processing device 150 may include any electronic device programmed to receive and process the alert signal indicating that the occupant is in distress and requires help from an emergency service provider 115. In response to receiving the alert signal, the processing device 150 may be programmed to discreetly initiate contact with the emergency service provider 115. In some instances, the processing device 150 may receive and the biometric signal output by the biometric system 130. The processing device 150 may be programmed to determine whether to contact the emergency service provider 115 based at least in part on the data represented by the biometric signal. Initiating contact with the emergency service provider 115 may include the processing device 150 commanding the communication module 125 to call the emergency service provider 115 directly (i.e., using telecommunications equipment incorporated into the host vehicle 100) or using the occupant's mobile device.

To reduce the likelihood of the processing device 150 inadvertently initiating the call to the emergency service provider 115, the processing device 150 may output a discreet notification signal. The discreet notification signal may include, e.g., a haptic alert to the occupant. An example haptic alert may include a brief seat or steering wheel vibration, causing the occupant's mobile device or fitness tracker to vibrate, etc. This way, the occupant may be notified that the call will be initiated without the perpetrator knowing. Moreover, the processing device 150 may wait to initiate the call to the emergency service provider 115 until a predetermined amount of time, such as, e.g., 5 seconds, has elapsed. During this time, the occupant can cancel the call via a user input such as by saying one of the disable words or by pressing a button or combination of buttons incorporated into, e.g., the infotainment system, steering wheel, instrument panel, or the like. In some instances, the processing device 150 may be programmed to remap one or more buttons in response to receiving the alert signal. By way of example only, a button located on the steering wheel may be remapped to serve as a call cancel button that, when pressed, will cause the processing device 150 to cancel the call to the emergency service provider 115. Accordingly, in response to the user input, the processing device 150 may be programmed to abort initiating contact with the emergency service provider 115.

The contact with the emergency service provider 115 may be discreet to protect the safety of the occupant in the host vehicle 100. For instance, when initiating the call to the emergency service provider 115, the processing device 150 may mute the speakers 140 while keeping the microphone 135 enabled. Thus, the operator who answers the call will be able to hear conversations within the host vehicle 100 but the occupants of the host vehicle 100, including the perpetrator, will be unable to hear the operator. Moreover, the processing device 150, by way of the communication module 125, may be programmed to discreetly transmit information about the host vehicle 100, including the location, speed, direction, etc., of the host vehicle 100 to the emergency service provider 115. Thus, the emergency service provider 115 can track the movements of the host vehicle 100.

Figure 3:
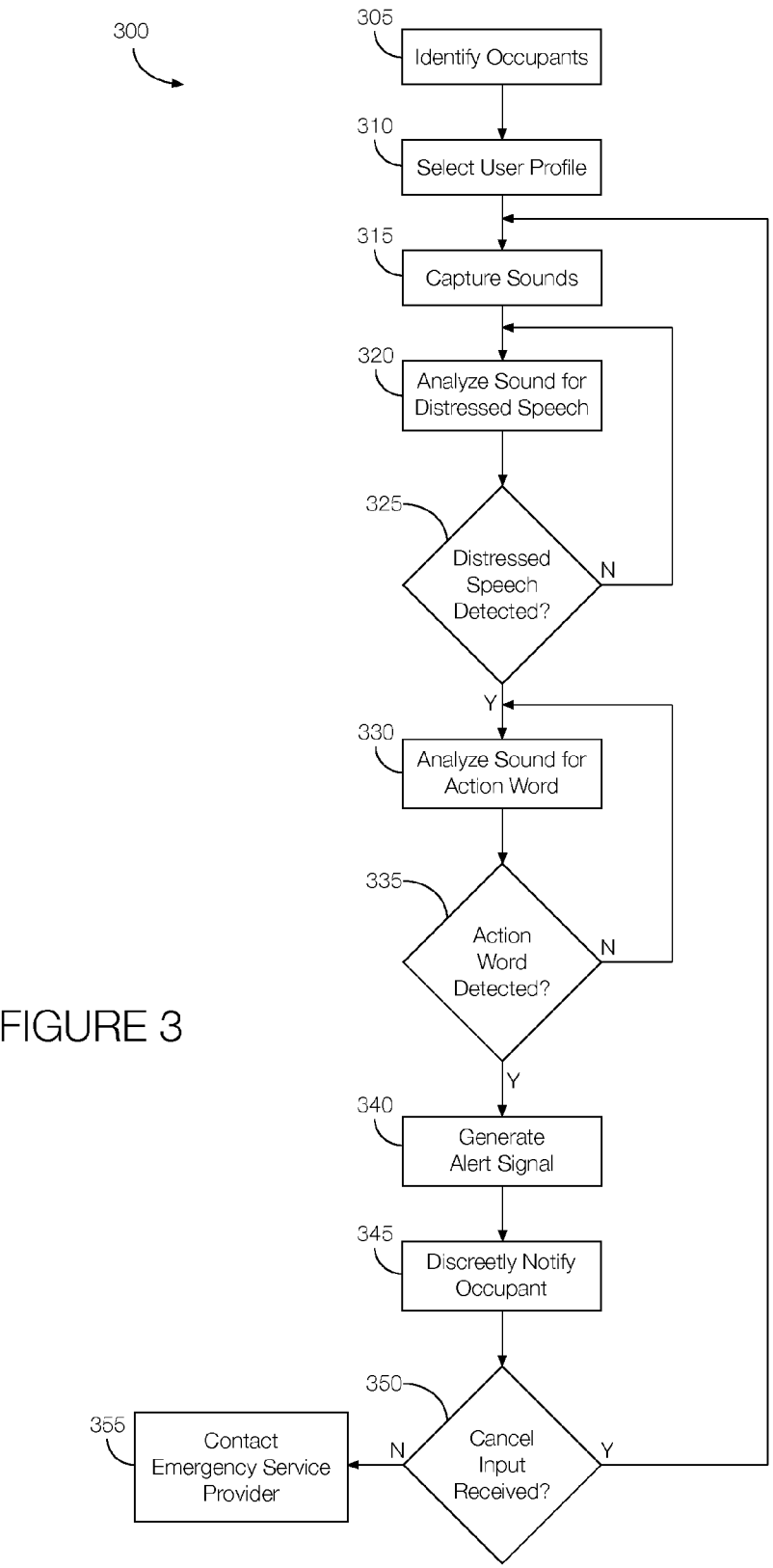
FIG. 3 is a flowchart of an example process that may be executed by the emergency calling system to discreetly initiate a call to an emergency service provider.

FIG. 3 is a flowchart of an example process 300 that may be executed by the emergency calling system 105 to discreetly initiate a call to an emergency service provider 115. The process 300 may run any time the host vehicle 100 is operating. In some instances, the process 300 may begin when the host vehicle 100 is turned on and a mobile device, such as a cell phone, is paired with the host vehicle 100.

At block 305, the emergency calling system 105 may identify one or more occupants. For example, the emergency calling system 105 may identify who is in the driver seat. The identification of the driver may be determined from, e.g., a user input, information received from a wearable device, the owner of a mobile device paired with the host vehicle 100, a camera, or the like.

At block 310, the emergency calling system 105 may select one or more user profiles associated with the identified occupants. Each user profile may identify an occupant's action words and disable words. Further, the user profile may help the speech analyzer 145 better analyze a particular occupant's speech.

At block 315, the emergency calling system 105 may capture sounds from the passenger compartment of the host vehicle 100. The sounds may be captured using an in-vehicle microphone 135. The microphone 135 may output a sound signal representing the captured sounds.

At block 320, the emergency calling system 105 may analyze the sound signal for distressed speech. For instance, the speech analyzer 145 may determine whether the sound signal represents changes in a speaker's spectral density. That is, the speech analyzer 145 may determine that an occupant is in distress when the occupant's spectral density shifts to higher frequencies and utterances are made with shorter durations. The speech analyzer 145 may further consider the signals output by the biometric system 130 in determining whether the sound signal includes distressed speech.

At decision block 325, the emergency calling system 105 may determine whether distressed speech has been detected. If so, the process 300 may proceed to block 330. Otherwise, the process 300 may return to block 320 until distressed speech is detected. Thus, the speech analyzer 145 may continue to analyze the sound signal for distressed speech until distressed speech is detected.

At block 330, the emergency calling system 105 may analyze the sound signal for any action words. As discussed above, the action word may include a predetermined word or phrase associated with the selected user profile. The speech analyzer 145, after having identified distressed speech, may "listen" for the action word.

At block 335, the emergency calling system 105 may determine whether the action word has been spoken. If so, the process 300 may proceed to block 340. Otherwise, the process 300 may return to block 330 until the action word is spoken. In other words, the speech analyzer 145 may continue to "listen" for action words after having identified distressed speech.

At block 340, the emergency calling system 105 may generate an alert signal. For instance, the speech analyzer 145 may generate the alert signal and transmit the alert signal to the processing device 150. The process 300 may proceed to block 345.

At block 345, the emergency calling system 105 may output a notification signal. The notification signal may discreetly indicate that the emergency calling system 105 is going to initiate contact with the emergency service provider 115. The discreet notification signal may include, e.g., a haptic alert to the occupant. An example haptic alert may include a brief seat or steering wheel vibration, causing the occupant's mobile device or fitness tracker to vibrate, etc. The notification signal may be generated and output by the processing device 150 in response to the processing device 150 receiving the alert signal from the speech analyzer 145.

At decision block 350, the emergency calling system 105 may determine whether a user input indicating a user's desire to cancel the call to the emergency service provider 115 has been received within a predetermined amount of time. The user input may include the user saying one of the disable words or pressing a button or combination of buttons incorporated into, e.g., the infotainment system, steering wheel, instrument panel, or the like. In some instances, as discussed above, the processing device 150 may remap one or more buttons in response to receiving the alert signal. By way of example only, a button located on the steering wheel may be remapped to serve as a call cancel button that, when pressed, will cause the processing device 150 to cancel the call to the emergency service provider 115. If such a user input is received, the emergency calling system 105 may abort any endeavors to contact the emergency service provider 115, and the process 300 may return to block 315. If no such user input is received, the process 300 may proceed to block 355.

At block 355, the emergency calling system 105 may contact the emergency service provider 115. For instance, the processing device 150 may initiate the contact with the emergency service provider 115 by outputting a signal commanding the communication module 125 to call the emergency service provider 115 directly (i.e., using telecommunications equipment incorporated into the host vehicle 100) or using the occupant's mobile device, such as a cell phone. Calling the emergency service provider 115 may include muting the in-vehicle speakers 140, as well as the speakers of the mobile device, prior to initiating the call. Thus, the operator who answers the call may still be able to hear conversations inside the passenger compartment and dispatch the appropriate emergency service personnel without tipping off a perpetrator.

The process 300 may end after block 355.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
   a microphone programmed to capture sounds in a passenger compartment of a vehicle and output a sound signal;
   a speech analyzer programmed to analyze the sound signal for distressed speech and for action words after detecting the distressed speech, wherein the speech analyzer is programmed to output an alert signal if distressed speech and action words are detected; and
   a processing device programmed to receive the alert signal and initiate contact with an emergency service provider in response to receiving the alert signal.

2. The vehicle system of claim 1, wherein the speech analyzer is programmed to detect distressed speech before analyzing the sound signal for the action words.

3. The vehicle system of claim 1, wherein the action word includes a predetermined word or phrase.

4. The vehicle system of claim 1, wherein the speech analyzer is programmed to analyze the sound signal based at least in part on a user profile.

5. The vehicle system of claim 4, wherein the speech analyzer is programmed to select the user profile among a plurality of user profiles.

6. The vehicle system of claim 1, wherein the user profile is associated with a vehicle occupant.

7. The vehicle system of claim 1, wherein the processing device is programmed to output a notification signal prior to initiating contact with the emergency service provider.

8. The vehicle system of claim 7, wherein the notification signal provides a haptic alert to a vehicle occupant, the haptic alert indicating that contact with the emergency service provider will be initiated.

9. The vehicle system of claim 1, wherein the processing device is programmed to abort initiating contact with the emergency service provider in response to a user input.

10. The vehicle system of claim 1, further comprising speakers, and wherein the processing device is programmed to mute the speakers prior to initiating contact with the emergency service provider.

11. A method comprising:
    capturing sounds in a passenger compartment of a vehicle;
    outputting a sound signal;
    analyzing the sound signal for distressed speech;
    analyzing the sound signal for action words after detecting distressed speech; and
    initiating contact with an emergency service provider if distressed speech and action words are detected.

12. The method of claim 11, wherein the action word includes a predetermined word or phrase.

13. The method of claim 11, wherein analyzing the sound signal includes analyzing the sound signal based at least in part on a user profile.

14. The method of claim 13, further comprising selecting the user profile among a plurality of user profiles.

15. The method of claim 13, wherein the user profile is associated with a vehicle occupant.

16. The method of claim 11, further comprising outputting a notification signal prior to initiating contact with the emergency service provider.

17. The method of claim 11, further comprising providing a haptic alert to a vehicle occupant, the haptic alert indicating that contact with the emergency service provider will be initiated.

18. The method of claim 11, further comprising receiving a user input to abort initiating contact with the emergency service provider.

19. A vehicle system comprising:
- a microphone programmed to capture sounds in a passenger compartment of a vehicle and output a sound signal;
- a speaker located in the passenger compartment;
- a speech analyzer programmed to analyze the sound signal for distressed speech, wherein the speech analyzer is programmed to analyze the sounds signal for action words after distressed speech is detected and output an alert signal if distressed speech and action words are detected; and
- a processing device programmed to receive the alert signal and initiate contact with an emergency service provider in response to receiving the alert signal.

\* \* \* \* \*